(12) United States Patent
Schmidt et al.

(10) Patent No.: US 7,502,283 B2
(45) Date of Patent: Mar. 10, 2009

(54) SYSTEMS AND METHODS FOR REWRITING DATA OF DATA TRACKS POTENTIALLY AFFECTED BY DATA TRANSFER OPERATIONS IN ROTATABLE STORAGE MEDIA

(75) Inventors: Thorsten Schmidt, Milpitas, CA (US); Richard M. Ehrlich, Saratoga, CA (US)

(73) Assignee: Panasonic Corporation, Osaka (JP)

( * ) Notice: Subject to any disclaimer, the term of this patent is extended or adjusted under 35 U.S.C. 154(b) by 918 days.

(21) Appl. No.: 11/016,395

(22) Filed: Dec. 17, 2004

(65) Prior Publication Data

US 2005/0141128 A1  Jun. 30, 2005

Related U.S. Application Data

(60) Provisional application No. 60/533,360, filed on Dec. 30, 2003, provisional application No. 60/533,385, filed on Dec. 30, 2003.

(51) Int. Cl.
*G11B 11/00* (2006.01)

(52) U.S. Cl. .................................. 369/13.11; 360/6
(58) Field of Classification Search ..................... None
See application file for complete search history.

(56) References Cited

U.S. PATENT DOCUMENTS 6,313,964 B1 * 11/2001 Lamberts et al. .............. 360/75

* cited by examiner

*Primary Examiner*—Joseph H Feild
*Assistant Examiner*—Parul Gupta
(74) *Attorney, Agent, or Firm*—Fliesler Meyer LLP (57) ABSTRACT

Systems and methods in accordance with embodiments can be used to re-write user data to a rotatable storage medium. When a position of a write element is not within a threshold during a data write operation, a part of a data track potentially affected by the write operation, while the position of the write element was not within the threshold, can be determined. When the device including the rotatable storage medium is free from other data transfer operations, the data of the data track potentially affected by the write operation can be re-written. In this manner, data that may be considered less reliable due to the misplacement of a write element during a data write operation, can be re-written.

4 Claims, 10 Drawing Sheets

SYSTEMS AND METHODS FOR REWRITING DATA OF DATA TRACKS POTENTIALLY AFFECTED BY DATA TRANSFER OPERATIONS IN ROTATABLE STORAGE MEDIA

CLAIM OF PRIORITY

This application claims priority from the following applications, which are hereby incorporated by reference in their entirety:

U.S. Provisional Application No. 60/533,360, entitled SYSTEMS FOR REWRITING DATA OF DATA TRACKS POTENTIALLY AFFECTED BY DATA TRANSFER OPERATIONS IN ROTATABLE STORAGE MEDIA, by Thorsten Schmidt et al., filed Dec. 30, 2003.

U.S. Provisional Application No. 60/533,385, entitled SYSTEMS FOR REWRITING USER DATA IN ROTATABLE STORAGE MEDIA, by Thorsten Schmidt et al., filed Dec. 30, 2003.

CROSS-REFERENCED TO RELATED APPLICATIONS

The following applications are cross-referenced and are hereby incorporated by reference in their entirety:

U.S. patent application Ser. No. 11/016,624, entitled SYSTEMS AND METHODS FOR REWRITING USER DATA IN ROTATABLE STORAGE MEDIA, by Thorsten Schmidt et al., filed Dec. 17, 2004.

FIELD OF THE INVENTION

The present invention relates to writing and re-writing user data in devices including rotatable storage media. The present invention further relates to re-writing user data previously written while a head or write element was positioned beyond a threshold as well as user data on a first track that may have been affected by a write operation to a second track.

BACKGROUND

Rotatable storage media devices, such as magnetic disk drives and optical disk drives, are an integral part of computers and other devices with needs for large amounts of reliable memory. Rotatable storage media devices are inexpensive, relatively easy to manufacture, forgiving where manufacturing flaws are present, and capable of storing large amounts of information in relatively small spaces.

A typical device having a rotatable storage medium includes a head disk assembly and electronics to control operation of the head disk assembly. The head disk assembly can include one or more disks. In a magnetic disk drive, a disk includes a recording surface to receive and store user information. The recording surface can be constructed of a substrate of metal, ceramic, glass or plastic with a very thin magnetizable layer on either side of the substrate. Data is transferred to and from the recording surface via a head mounted on an actuator assembly. Heads can include one or more read and/or write elements, or read/write elements, for reading and/or writing data. Drives can include one or more heads for reading and/or writing. In magnetic disk drives, heads can include a thin film inductive write element and a magneto-resistive read element.

Disk drives can operate in one or more modes or operations. In a first mode or operation, often referred to as seek or seeking, a head moves from its current location, across a disk surface to a selected track. In a second mode, often referred to as track following, a head is positioned over a selected track for reading data from a track or writing data to a track.

In order to move a head to a selected track or to position a head over selected tracks for writing and reading, servo control electronics are used. In some disk drives, one disk can be dedicated to servo information. The servo disk can have embedded servo patterns that are read by a head. Heads for data disks can be coupled to the servo disk head to be accurately positioned over selected tracks. In other disk drives, servo information can be embedded within tracks that also contain user data on the medium at regular intervals. Servo information is read as a head passes over a track to accurately position the head relative to a track.

While servo positioning circuitry is generally accurate, heads can drift from desired locations during track following operations. Reading or writing data during inaccurate head positioning can have adverse affects on drive performance.

During write and read operations, the drive attempts to keep the appropriate head or element as close to the center of a selected data track as possible. Data written while the write element is positioned away from a track centerline can later be difficult to read, possibly resulting in transfer errors. Furthermore, data written away from a track centerline can corrupt data on other tracks as well as interfere with reading of data on other tracks.

In modern disk drives, tracks are placed increasingly closer together to increase data storage capacity. Narrower tracks are often used in order to increase the tracks per inch (TPI) on a disk. Measures can be used in drives to ensure that reliability and performance are maintained as data storage capacity increases.

DETAILED DESCRIPTION

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In the following description, various aspects of the present invention will be described. However, it will be apparent to those skilled in the art that the present invention may be practiced with only some or all aspects of the present invention. For purposes of explanation, specific numbers, materials, and configurations are set forth in order to provide a thorough understanding of the present invention. However, it will be apparent to one skilled in the art that the present invention may be practiced without the specific details. In other instances, well-known features are omitted or simplified in order not to obscure the present invention.

Parts of the description will be presented in data processing terms, such as data, selection, retrieval, generation, and so forth, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through electrical, optical, and/or biological components of a processor and its subsystems.

Various operations will be described as multiple discrete steps in turn, in a manner that is most helpful in understanding the present invention, however, the order of description should not be construed as to imply that these operations are necessarily order dependent.

Various embodiments will be illustrated in terms of exemplary classes and/or objects in an object-oriented programming paradigm. It will be apparent to one skilled in the art that the present invention can be practiced using any number of different classes/objects, not merely those included here for illustrative purposes. Furthermore, it will also be apparent that the present invention is not limited to any particular software programming language or programming paradigm.

Figure 1:
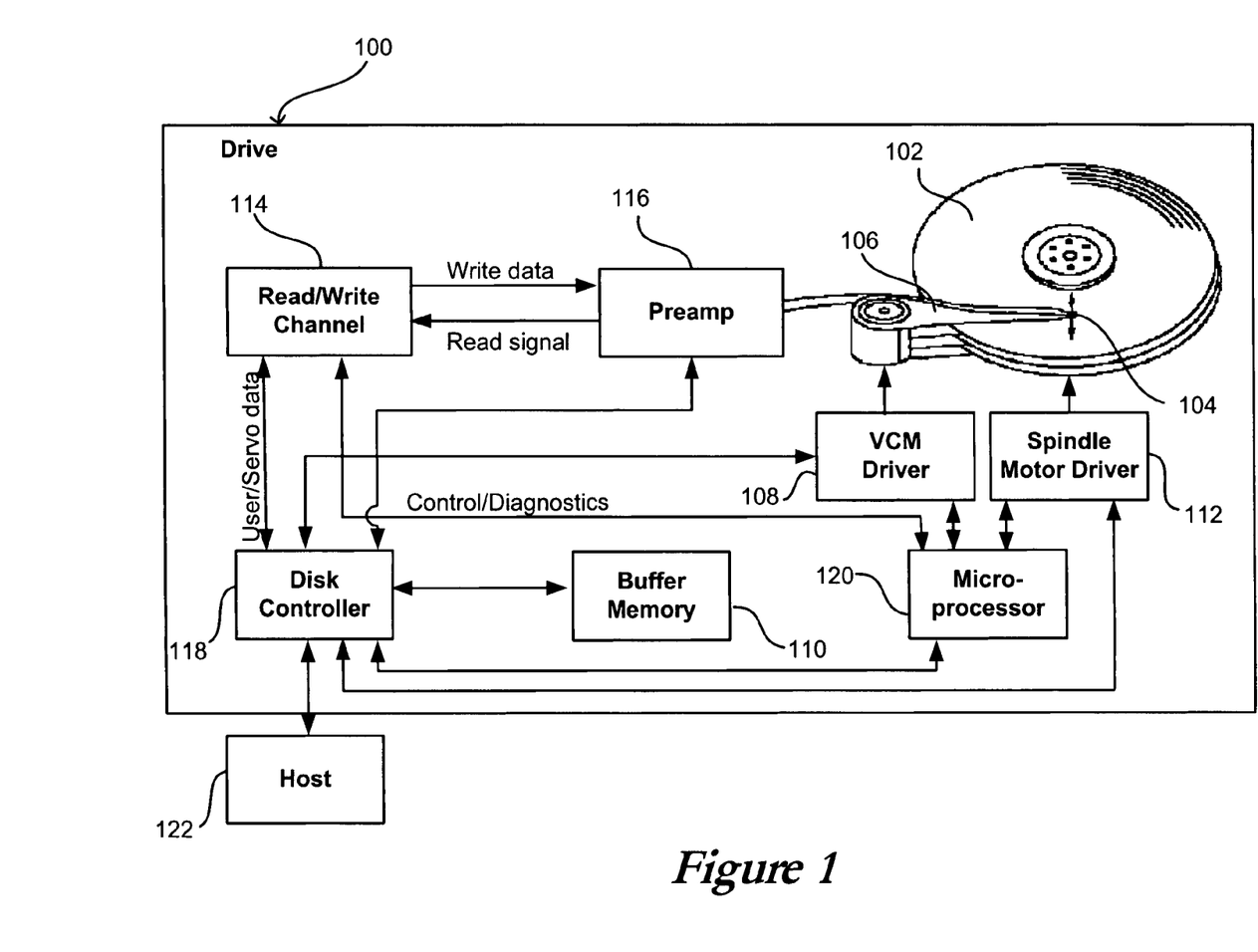
FIG. 1 is a diagram showing components of an exemplary disk drive that can be used in accordance with one embodiment of the present invention.

Systems and methods in accordance with one embodiment of the present invention can be used when writing and attempting to write user data to a rotatable storage medium in a data storage device, such as a hard disk drive. Although the following description is provided using a hard disk drive, it will be understood that the principles, systems, and methods can be used in any device including a rotatable storage medium. For example, a typical disk drive 100, as shown in FIG. 1, includes at least one magnetic disk 102 capable of storing information on at least one of the surfaces of the disk. A closed-loop servo system can be used to move an actuator arm 106 and data head 104 over the surface of the disk, such that information can be written to, and read from, the surface of the disk. The closed-loop servo system can contain, for example, a voice coil motor driver 108 to drive current through a voice coil motor (not shown) in order to drive the actuator arm, a spindle motor driver 112 to drive current through a spindle motor (not shown) in order to rotate the disk(s), a microprocessor 120 to control the motors, and a disk controller 118 to transfer information between the microprocessor, buffer, read channel, and a host 122. A host can be any device, apparatus, or system capable of utilizing the data storage device, such as a personal computer or Web server.

The drive can contain at least one processor, or microprocessor 120, that can process information for the disk controller 118, read/write channel 114, VCM driver 108, or spindle driver 112. The microprocessor can also include a servo controller, which can exist as an algorithm resident in the microprocessor 120. The disk controller 118, which can store information in buffer memory 110 resident in the drive, can also provide user data to a read/write channel 114, which can send data signals to a current amplifier or preamp 116 to be written to the disk(s) 102, and can send servo and/or user data signals back to the disk controller 118. In one embodiment buffer memory 110 can be cache memory such as SRAM or DRAM. Microprocessor 120 can further include internal memory. In some embodiments, the drive can further include a non-volatile memory (not shown) such as flash memory that be accessed by the microprocessor or disk controller.

Figure 2:
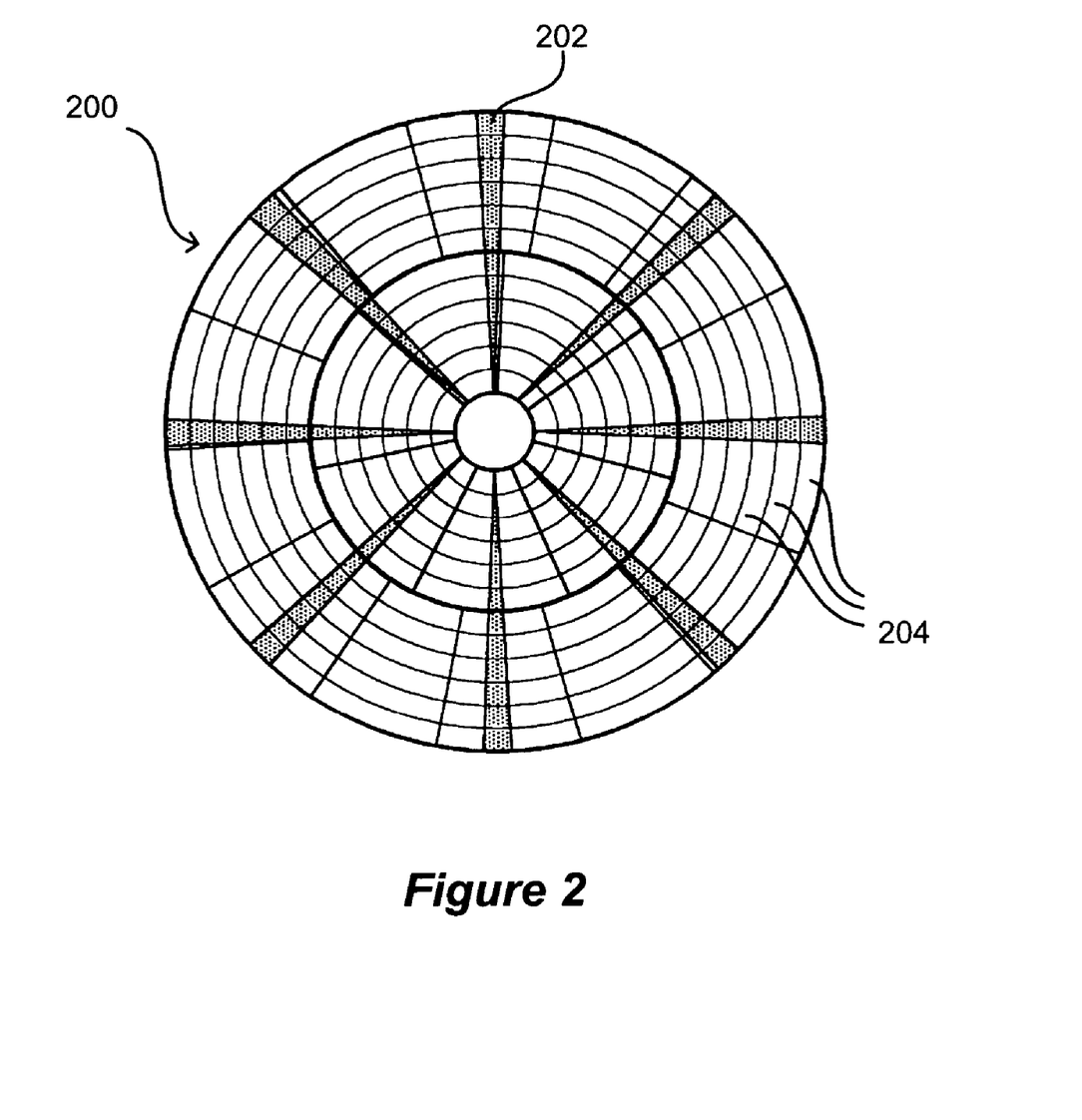
FIG. 2 is a top view of a rotatable storage medium that can be used in the drive of FIG. 1.

The information stored on such a disk can be written in concentric tracks, extending from near the inner diameter of the disk to near the outer diameter of the disk 200, as shown in the exemplary disk of FIG. 2. In an embedded servo-type system, servo information can be written in servo wedges 202, and can be recorded on tracks 204 that can also contain data. In a system where the actuator arm rotates about a pivot point such as a bearing, the servo wedges may not extend linearly from the inner diameter (ID) of the disk to the outer diameter (OD), but may be curved slightly in order to adjust for the trajectory of the head as it sweeps across the disk.

Figure 3:
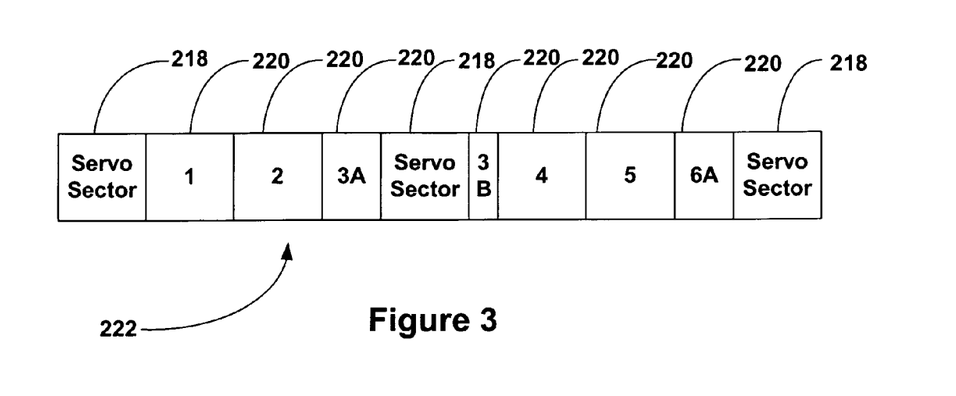
FIG. 3 is an illustration of a portion of a track of the medium of FIG. 2.

A portion of an exemplary track 222 of storage disk 200 is illustrated in FIG. 3. Servo sectors 218 split the track 222 into multiple data sectors 220. Each servo sector 218 is associated with the immediately following data sectors 220, as defined by a direction of rotation of disk 200. In the exemplary embodiment shown, identification fields for each data sector 220 are not used. As is illustrated, servo sectors can split data sectors resulting in a non-integer number of data sectors between servo wedges. The number of tracks may vary by embodiment. In one embodiment, for example, a typical number of servo-tracks for a drive today could vary from approximately 20000 (for a one-inch diameter disk) to approximately 100000 (for a 3.5-inch diameter disk).

The servo information often includes servo bursts that can form transitions or boundaries. A boundary or burst boundary as used herein does not mean or imply that servo bursts forming a boundary necessarily have a substantially common edge as the bursts can be spaced such that there is a gap radially or circumferentially between the bursts. The servo information can be positioned regularly about each track, such that when a data head reads the servo information, a relative position of the head can be determined and that determination can be used by a servo controller to adjust the position of the head relative to the track. For each servo wedge, this relative position can be determined in one example as a function of the target location, a track number read from the servo wedge, and the amplitudes or phases of the bursts, or a subset of those bursts.

The position of a head or element, such as a read/write head or element, relative to a target or desired location such as the center of a track or other desired location, will be referred to herein as position-error. Position-error distance may be used to refer to the distance between a target or desired location and an actual or predicted location of a head or element. The signal generated as a head or element moves across servo bursts or boundaries between servo bursts is often referred to as a position-error signal (PES). The PES can be used to represent or indicate a position of the head or element relative to a target location such as a track centerline identified by a boundary between servo bursts.

Figure 4:
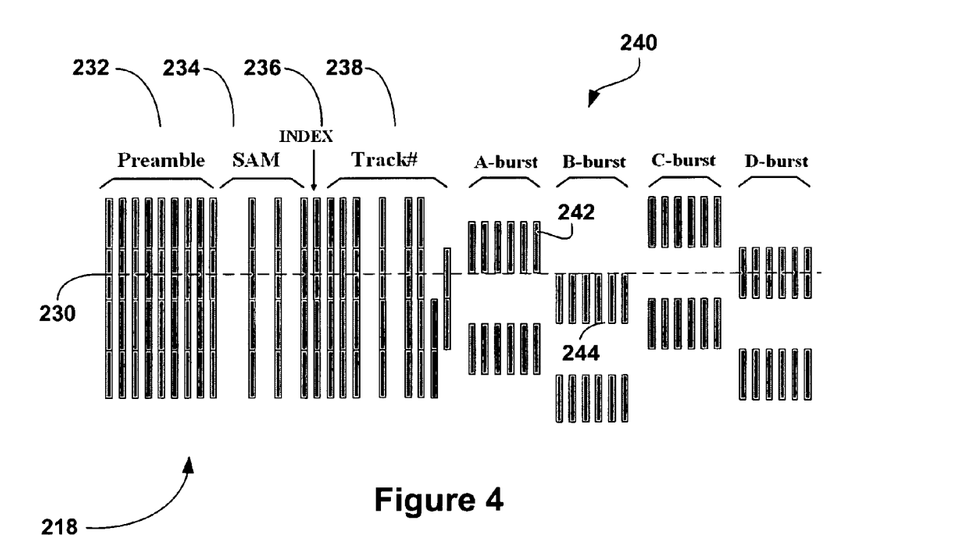
FIG. 4 is an illustration of a servo sector of the track of FIG. 3.

An exemplary servo sector 218 is illustrated in FIG. 4. The servo information shown includes a preamble 232, a servo address mark ("SAM") 234, an index 236, a track number 238, and servo bursts 240. These fields are exemplary, as other fields may be used in addition to, or in place of, the exemplary fields, and the order in which the fields occur may vary. The preamble 232 can be a series of magnetic transitions which can represent the start of the servo sector 218. In the servo sector of FIG. 4, the SAM 234 specifies the beginning of available information from the servo sector 218. The track number 238, usually gray coded, is used for uniquely identifying each track. Servo bursts 240 are positioned regularly about each track, such that when a data head reads the servo information, a relative position of the head can be determined that can be used by a servo processor to adjust the position of the head relative to the track. The PES can also be used to predict a position of a head or element. Sampled PES values over time, for example, can be used to determine a predicted position of an element. Given a previously determined or known position, velocity of an element (the determination of which will be described herein) can be multiplied by time to determine a distance an element has traveled or will travel to predict an element position.

A centerline 230 for a given data track can be "identified" relative to a series of bursts, burst edges, or burst boundaries, such as a burst boundary defined by the lower edge of A-burst 242 and the upper edge of B-burst 244 in FIG. 4. The centerline can also be defined by, or offset relative to, any function or combination of bursts or burst patterns. For example, if the destination is a write center, a location at which the PES value is zero defines the center of the write track. Any location relative to a function of the bursts can be selected to define track position. For example, if a read head evenly straddles an A-burst and a B-burst, or portions thereof, then servo demodulation circuitry in communication with the head can produce equal amplitude measurements for the two bursts, as the portion of the signal coming from the A-burst above the centerline is approximately equal in amplitude to the portion coming from the B-burst below the centerline. The resulting computed PES can be zero and represent a position at track center if the radial location defined by the A-burst/B-burst (A/B) combination, or A/B boundary, is the center of a data track, or a track centerline. In such an embodiment, the radial location at which the PES value is zero can be referred to as a null-point. Null-points can be used in each servo wedge to define a relative position of a track. If the head is too far towards the outer diameter of the disk, or above the centerline in FIG. 4, then there will be a greater contribution from the A-burst that results in a more "negative" PES. Using the negative PES, the servo controller could direct the voice coil motor to move the head toward the inner diameter of the disk and closer to its desired position relative to the centerline. This can be done for each set of burst edges defining the shape of that track about the disk.

The servo scheme described above is one of many possible schemes for combining the track number read from a servo wedge and the phases or amplitudes of the servo bursts. Many other schemes are possible that can be used in accordance with various embodiments.

Figure 5:
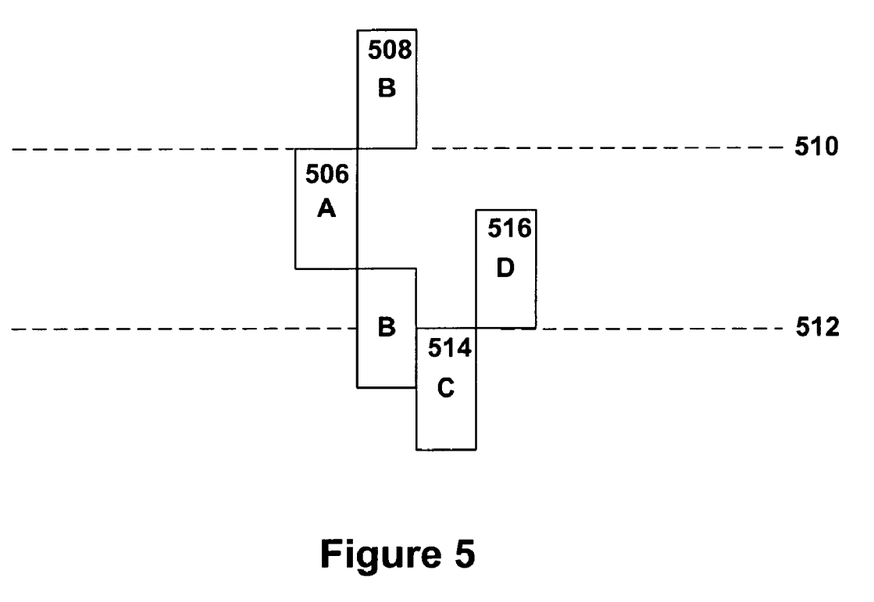
FIG. 5 is an illustration of servo bursts that can be used to identify tracks on the medium of FIG. 2.

Despite the use of servo positioning information to control head position, heads of disk drives often move in relation to centerlines of selected tracks while reading data from a track or writing data to a track. Referring now to FIG. 5, there is shown an exemplary servo pattern that can be used to identify data tracks on a rotatable storage media. Other track formats and servo patterns can be used in accordance with other embodiments. A-burst 506 and B-burst 508 can identify a centerline 510 of a data track, while C-burst 514 and D-burst 516 can identify a centerline 512. Centerlines can be written or calculated. In an exemplary disk drive, a written centerline can be defined by a written burst pattern. In another exemplary disk drive, a calculated or averaged centerline can be determined from variations in written servo bursts. An averaged or calculated track centerline can be used to remove some effects of written and repeatable runout caused by misplaced heads during servo writing. In the servo pattern example shown, often referred to as a 3-step or 3-pass per track 2-burst track center servo pattern, the widths of the data tracks are equal to 3/2 times the widths of the servo tracks or servo bursts. In other embodiments, servo bursts can be equal to or larger than data tracks. The spacing of tracks on disk 202 can be defined by these burst patterns, and is generally referred to as track pitch. Track pitch may be defined in various ways. Track pitch can refer to a distance between theoretical track centers, e.g., the distance between lines 510 and 512. It may also refer to a distance between track boundaries or the distance between a top portion of an erase band on one side of a track and a top portion of an erase band on an opposite side of the track. In the example shown, the servo track TPI is equal to 3/2 times the data track TPI. In other embodiments, servo track TPI can be equal to data track TPI. Servo track TPI may be any fraction or multiple of a data track TPI.

The path of a head following a track having centerline 510 may vary radially from the written or calculated centerline of the track. This may cause reading of data in adjacent tracks, reading of erroneous data, writing unreadable data, or writing data into adjacent tracks. To prevent these negative effects on drive performance, thresholds can be used.

The location of heads or elements during seek operations and during the transition between seek operations and track-following operations is also important. During a seek, a selected head is moved to a target track on the corresponding disk surface. A velocity profile or estimation can define a desired head trajectory as the head is accelerated and decelerated in order to place the head over the target track. As the head nears the destination track, a settling mode can be entered to settle the head onto the target track. After settling, the servo system can enter the track following mode to maintain the head over the target track for reading and/or writing. In order to ensure reliable reading and writing of data on selected tracks, criteria can be established to determine when a seek and/or settle mode should end and a track following mode begin. The criteria used to determine when to shift from a seek and/or settle mode to a track following mode is often referred to as end-of-seek criteria. In some embodiments, settling is not a separate mode and is part of the seek mode.

In one embodiment, thresholds and end-of-seek criteria can be stored on a selected portion of the disk or stored in some nonvolatile memory such as flash memory within the drive. Thresholds and end-of-seek criteria can be loaded into a faster memory such as SRAM or DRAM on start up of a drive to increase performance. Servo control circuitry, such as a controller, processor, or algorithm resident in a processor or controller can access the thresholds and end-of-seek criteria to use during drive operations.

Write-fault thresholds can be used to inhibit or interrupt writing during a data write operation, as the results of such write operations can be unreliable, and such write operations can possibly damage previously written data to one or more other tracks such as those tracks adjacent the target track. Thresholds can be expressed in numerous ways. In one embodiment, a threshold can be expressed as a distance or a combination of distance and head or element velocity. In other embodiments, thresholds can be expressed as a percentage or fraction of track pitch or width. A threshold expressed as a distance or percentage of track pitch can define a zone about the center of a track in which safe writing can take place. If the write element is not within the threshold, writing can be inhibited.

In one embodiment, a write operation or writing can be inhibited when a distance of a head or element from a track centerline is greater than or equal to a threshold distance from the centerline. In another embodiment, writing can be inhibited when a position of a head or element, a measured position of a head or element, or a predicted position of a head or element reaches or exceeds a threshold position. In yet another embodiment, writing can be inhibited when a head or element is not within a defined safe zone about the center of a track. For example, a write stop threshold may be expressed as 10% of the track pitch. Write operations can be enabled when the head or element is within the safe zone identified by the thresholds, i.e. when the head or element (or portion thereof) is less than 10% of the track pitch (width) away from the centerline. During a write operation, the servo controller can monitor head or element position (such as by monitoring the PES) and inhibit or interrupt the operation if the threshold is reached or exceeded. Data write operations, as used herein, can include writing data as well as positioning a head or element prior to beginning writing.

Figure 6:
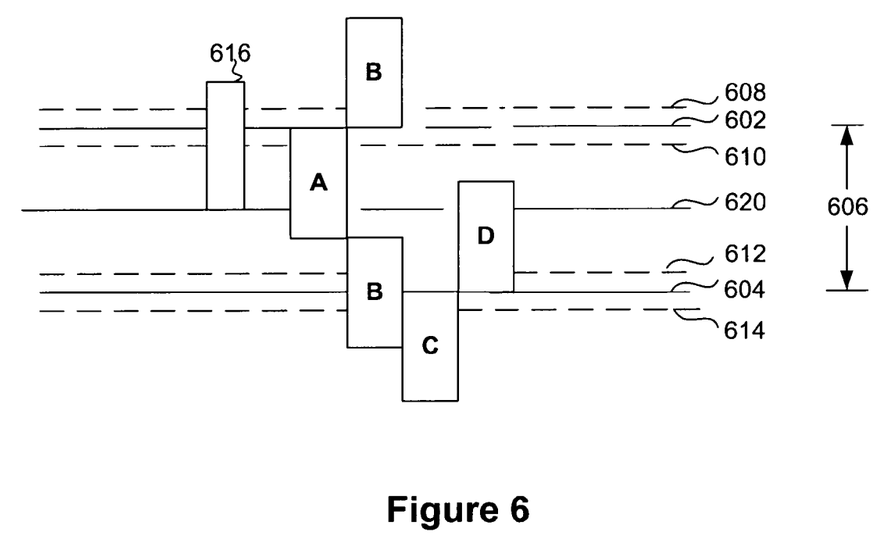
FIG. 6 is an illustration of servo bursts that can be used to identify tracks on the medium of FIG. 2, wherein thresholds are illustrated with respect to track centerlines.

FIG. 6 illustrates an exemplary servo pattern identifying centerlines 602 and 604. Using the term track pitch to refer to the distance between centerlines of tracks, the track pitch for this combination is shown as reference 606. Thresholds 608-614 can be chosen at distances equal to 10% of the track pitch from the centerlines 602 and 604.

While writing data along data track centerline 602, if a center of element 616 is positioned at a location beyond threshold 608 or 610, the servo controller can inhibit or interrupt writing. It will be appreciated that reading and/or writing can be inhibited when a position of a region of the head, such as a central region, an outer region, or any other region reaches or exceeds a threshold. Additionally, writing can be inhibited when a position of a read element or a write element reaches or exceeds the threshold. Note that drives today typically have a read head and a write head that are offset from each other both radially and circumferentially. Normally, when writing, the reader (which is also used to read servo wedge data in addition to user data) is kept at a position null point.

The write element, while writing data at location(s) away from the track centerline, but not beyond a write-stop threshold, will not be inhibited from writing. However, this data may be considered unreliable in comparison to data written while the write element is positioned substantially over a track centerline. A subsequent read of such data may be more likely to fail due to the misplaced data. In addition, a read element may have to be repositioned away from the track centerline to attempt to read the data. As known in the art, misplaced data can lead to numerous problems when subsequently attempting to read such data. Data written in this range is not considered to be so misplaced as to warrant inhibiting it from being written in the first place, but is less desirable than data written closer to a track centerline.

In addition, write operations performed while an element is so positioned may affect data in adjacent tracks. Line 620 illustrates the effective boundary between the two data tracks identified by centerlines 602 and 604. As can be seen, when positioned at the established threshold 610 (measured from the center of the element), a lower edge of element 616 is located along the boundary line 620. If the servo controller is set to inhibit writing when the element exceeds the threshold, it is possible for element 616 to write data along the boundary between the two data tracks. Furthermore, if a delay exists between determining that the element is beyond the threshold and inhibiting writing, it is possible that element 616 may write data intended for the track identified by centerline 602 to the track identified by centerline 604.

In other examples, the element may have a larger width. Thus, when the element reaches the threshold, it maybe located over a part of the track identified by centerline 604. In any of these cases, it is possible for the element to write over data located in the adjacent track or make it harder to read data in an adjacent track even without writing over the data in the adjacent tracks. By "squeezing" the data of two tracks close together, interference may be seen when trying to read data in the track. The element is not positioned at such a distance to warrant inhibiting a write due to the possibility of irretrievably losing data written in an adjacent track. Nevertheless, the data in an adjacent track may be overwritten or "squeezed" to such a degree that the data is considered less reliable.

A second threshold, referred to as a re-write threshold herein, can be established to overcome some of the adverse consequences caused by write operations performed while an element is away from a track centerline, but not far enough way to warrant inhibiting the write. The re-write threshold can be smaller or lower (e.g. a smaller value of the PES or at a closer distance from the track centerline) than the write-stop threshold. Data written while the element is positioned at or beyond the re-write threshold, but not at or beyond the write-stop threshold, can be re-written using low-priority techniques as described herein. Furthermore, portions of adjacent tracks that may be affected by such write operations can be written using low-priority techniques.

Figure 7:
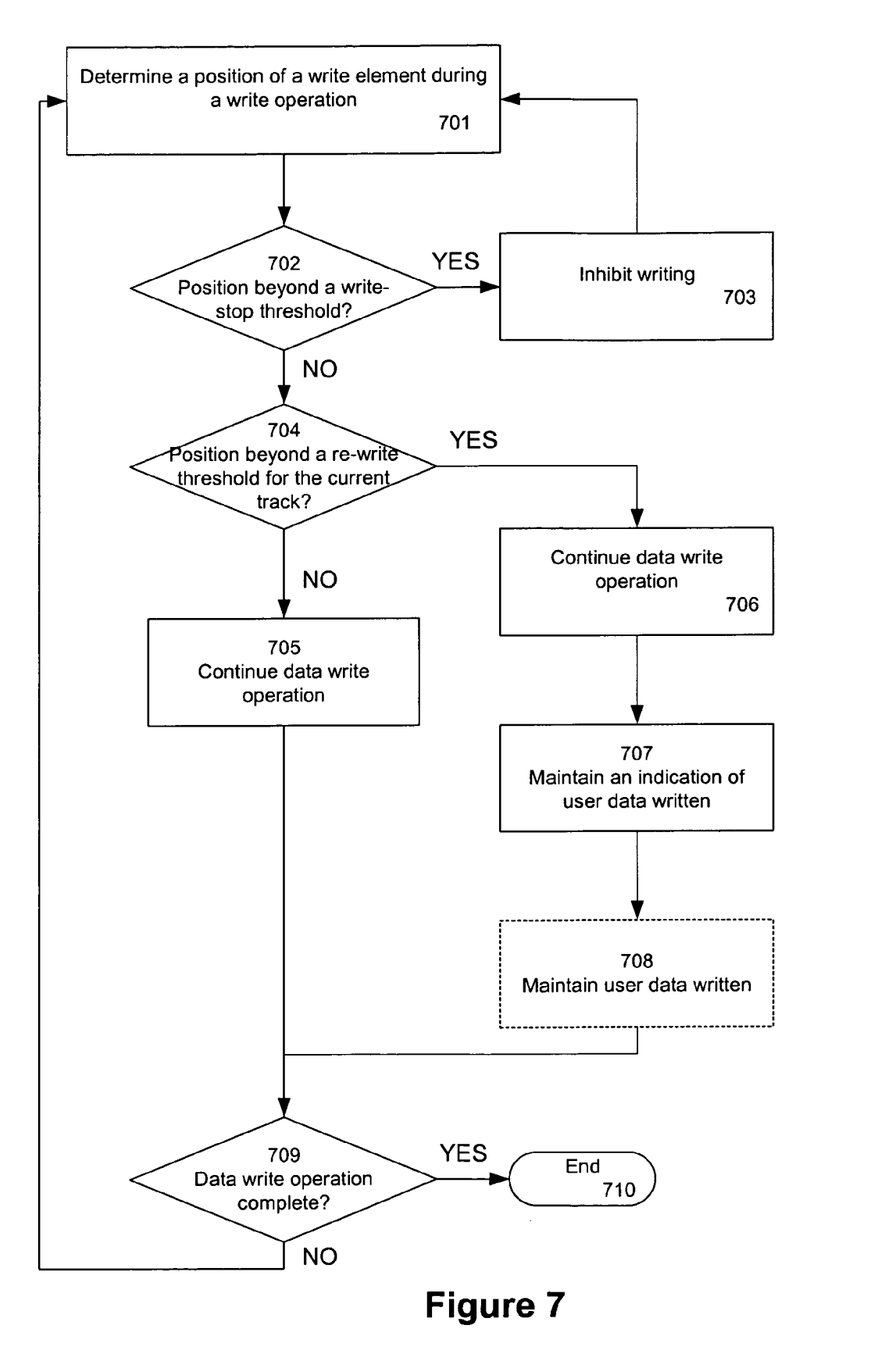
FIG. 7 is a flowchart in accordance with an embodiment for writing user data to a rotatable storage medium and identifying user data that can be re-written when the drive is available.

FIG. 7 is a flowchart in accordance with an embodiment for writing user data to a rotatable storage medium and identifying user data that can be re-written when the drive is available or free from other operations. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways. At step 701, a position of a write element relative to a data track during a data write operation can be determined. In one embodiment, determining the write element position comprises determining a distance between a location of the write element and a centerline of the data track being written or to be written. A value of the PES generated as a read element reads servo information can be used to identify the distance.

At step 702, the position of the write element can be compared to a write-stop threshold, to determine if the position is at or beyond the write-stop threshold. A position of the write element can be compared to a threshold position (relative to a track centerline) in one embodiment. In other embodiments, comparing the position of the write element can comprise determining whether a distance of the write element from a track centerline is greater than a threshold distance. A PES value, generated as a read element reads servo information, can be compared to a threshold PES value to determine if the write element has exceeded the write-stop threshold.

If it is determined that the write element has exceeded a write-stop threshold, writing during a portion of the data write operation can be inhibited at step 703. In one embodiment, writing is inhibited while the position of the write element is beyond the threshold. In another embodiment, writing can be inhibited for a data sector if the position exceeds the threshold. For example, if the position of the write element while writing a data sector exceeds the threshold at any point while writing the data sector, writing for the entire data sector can be inhibited. In such an example, writing for a sector can be inhibited after writing to the sector has begun. In another example, a position of the write element prior to writing a data sector can be determined. If the position exceeds the threshold, writing of the data sector can be inhibited before writing to the sector starts.

After writing is inhibited, operation according to the flowchart can proceed to step 701 to determine another distance. Positions and distances can be determined at step 701 at various increments during write operations. In one embodiment for example, a position can be determined at the maximum sampling rate of servo information.

If the position of the write element does not exceed the write-stop threshold, as determined at step 702, a determination can be made at step 704 as to whether the write element position exceeds a re-write threshold for the current track, which is typically smaller than the write-stop threshold. Whether the position of the write element exceeds the re-write threshold for the current track can be determined as previously described with respect to the write-stop threshold at step 702. For example, the PES can be monitored to determine whether a distance between the write element and the data track centerline exceeds a threshold distance.

If the position does not exceed the re-write threshold for the current track, the data write operation can continue at step 705. Continuation of the data write operation can include writing user data during all or a portion of the data write operation. For example, user data can be written for a pre-determined portion of a revolution of the media or for a pre-determined number of data sectors after determining that the write element is within the re-write threshold. In one embodiment, a single data sector is written if it is determined that the write element is within the write-stop threshold. In various embodiments, continuation of the data write operation can simply include enabling or not disabling the writing of user data in accordance with another data write operation technique.

If the write element position exceeds the re-write threshold for the current track, the data write operation can continue at step 706. Continuation of the data write operation at step 706 can include writing user data during all or a portion of the data write operation as previously described with respect to step 705.

At step 707, an indication of user data written while the write element position exceeded the re-write threshold can be maintained. The indication can include any suitable information identifying the user data. In one embodiment, an indication of a data sector (for example, a cylinder, head, and sector number address) or portion of a data sector to which data was written while the write element position exceeded the re-write threshold can be maintained. A table of the indications can be maintained in one embodiment. In various embodiments, the indications can be maintained in memory within the disk drive or other device including a rotatable storage medium. The indications can be written to and stored in a cache memory such as memory 110, a non-volatile memory such as flash memory, or even on a portion of the media such as on system tracks located outside of user data.

At optional step 708, the user data written while the element was positioned beyond the re-write threshold can be maintained. In one embodiment, the data can be maintained by writing it to and storing it in a cache memory such as memory 110. In many drive applications, the data is already stored in the cache memory as part of the data write operation. Accordingly, the data need not be written to the cache, but merely not deleted or overwritten. In another embodiment, the data can be written to a selected portion of the rotatable storage media such as to the system tracks located beyond the data tracks. In yet another embodiment, the data can be written to and stored in a non-volatile memory such as flash memory within the drive.

At step 709, it can be determined whether the data write operation is complete. In one embodiment, making the determination can comprise determining whether all data to be written during the data write operation has been written or whether all data sectors to be written during the operation have been written. If the data write operation is complete, operation according to the flowchart can end at step 710. If operation is not complete, the flowchart returns to step 701 where a determination of the write element position is made.

Figure 8:
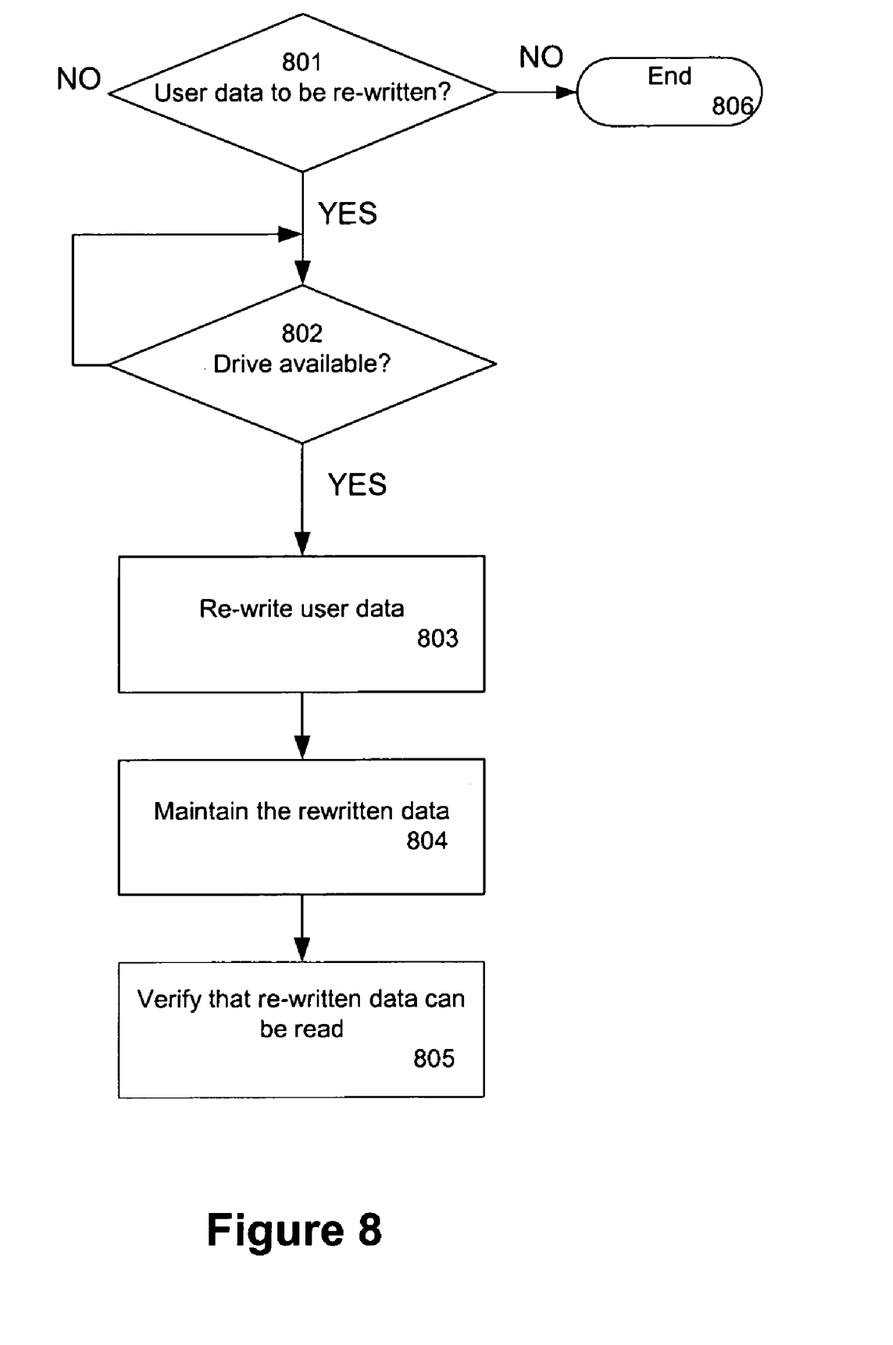
FIG. 8 is a flowchart in accordance with an embodiment for re-writing user data written while a write element is positioned beyond a re-write threshold.

FIG. 8 is a flowchart in accordance with an embodiment for re-writing user data written while a write element is positioned beyond a re-write threshold. In one embodiment, the flowchart of FIG. 8 can be used to re-write user data determined to have been written while a write element was positioned beyond a re-write threshold according to the flowchart of FIG. 7. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

At step 801, it can be determined whether there is user data to be re-written. In one embodiment, a list of indications of user data written while the write element was positioned beyond a re-write threshold can be accessed to determine if there is user data to be re-written. For example, a microprocessor or disc controller can access a memory, such as a cache memory, flash memory, or the rotatable media, to determine if there are any indications of user data to be re-written. The indications can be stored in a table format, for example. In one embodiment, the indications can be stored in a manner indicating the degree to which the write element was out of position when writing the respective data. For example, the indications could be listed in an order according to the degree of position-error. In this manner, data that is potentially more unreliable can be re-written before other data written while the write element was out of position. If there is no user data to be re-written, operation of the flowchart of FIG. 8 can end at step 806.

If there is data to be re-written, at step 802 it can be determined if the drive is available. A determination as to the availability of the drive can be made using various criteria and factors. In one embodiment, the drive can be determined to be available if the drive is free from any other read or write operations. For example, the microprocessor or disk controller can determine whether there are any pending operations (such as those that may be queued for execution) and/or whether the drive is currently executing any other operations. Although not necessary, it can be desirable in various applications to ensure that the drive is free from all other operations before re-writing any previously written user data. In this manner, drive performance such as read access times and write times are not affected by re-writing previously written data.

At step 803, user data identified by the list of indications can be re-written. In embodiments where the user data is maintained in cache, flash, or any other suitable memory, the user data can be re-written directly by positioning the write element over the appropriate track and data sector and re-writing the data. The microprocessor or disk controller can directly access the data and provide the information to the read/write channel for writing to the media. If the data has been written to a selected portion of the disk such as on a selected portion of the disk beyond the data tracks (e.g., at the system tracks), the data can be read by a read element, maintained in cache memory, and then re-written to the appropriate data track.

At step 804, the user data re-written at step 803 can be maintained. In one embodiment, the data is merely retained in cache memory. Many drives cache recently read and written data. In other embodiments, the data can be written and stored in some other memory such as a flash memory or on a portion of the rotatable media. At optional step 805, the drive can verify that the data maintained can be read. Although optional, step 805 can be used to determine if the data was accurately re-written at step 803. If the verification fails, the drive can attempt to re-read the data from the part of the data track potentially infringed. In one embodiment, methods for re-positioning the read element for reading can be used. For example, the read element can be "stepped across" the data track in order to read the data.

Re-writing of user data can be performed according to various priorities in various embodiments. A list of indications of user data to be re-written, maintained as previously described, can include or be organized according to the degree of position-error for the user data referred to by a particular indication. Accordingly, data considered to be less reliable can be re-written before more reliable data.

Figure 9:
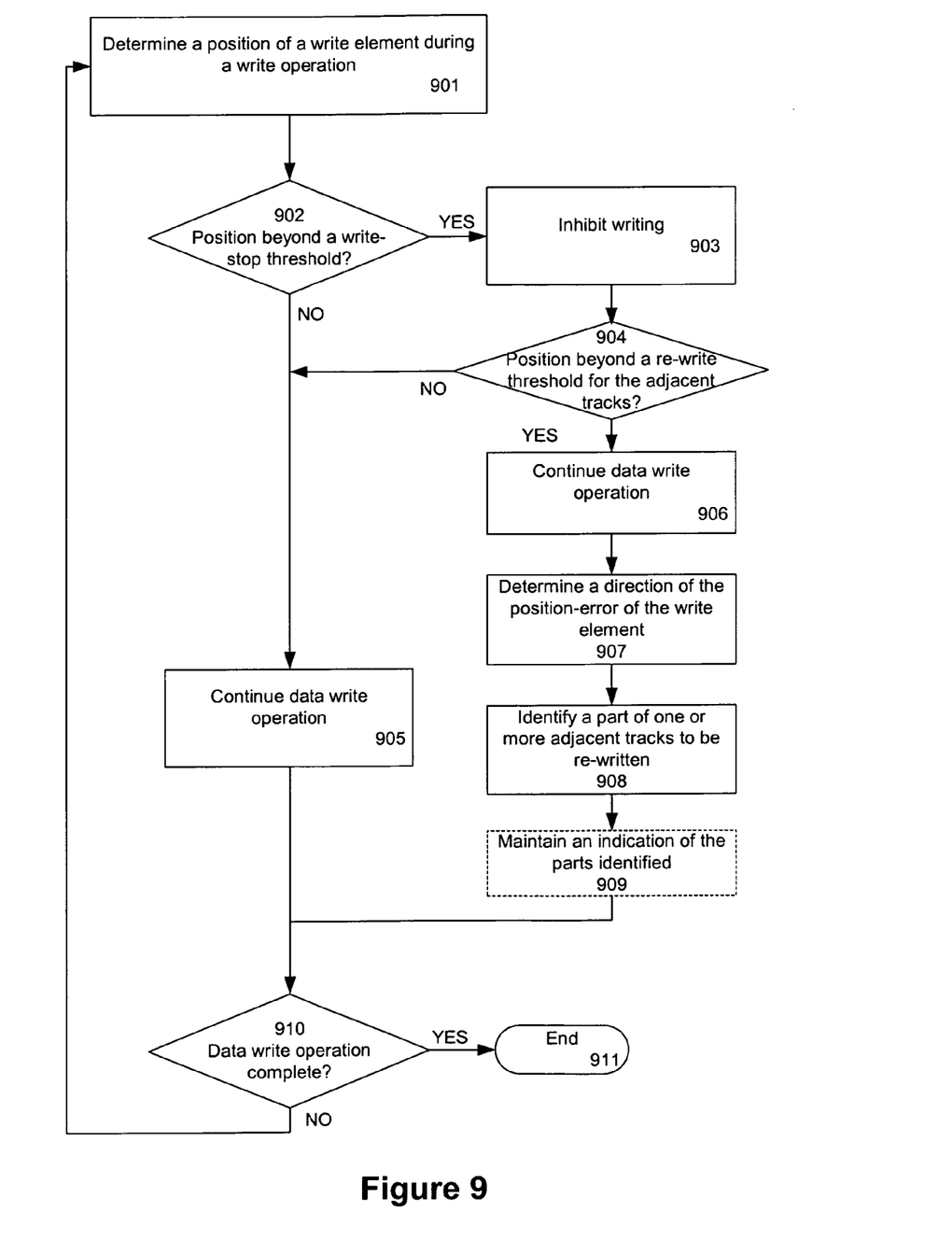
FIG. 9 is a flowchart in accordance with an embodiment for determining user data or a location of user data potentially infringed by a write operation.

FIG. 9 is a flowchart in accordance with an embodiment for determining user data or a location of user data potentially infringed by a write operation. Steps 901-903 can be performed in accordance with steps as 701-703 of FIG. 7, previously described. However, after writing is inhibited at step 903, operation according to the flowchart can proceed to step 904. A determination can be made at step 904 as to whether the write element position exceeds a re-write threshold for the adjacent tracks, which is typically larger than the write-stop threshold of the current track. Whether the position of the write element exceeds the re-write threshold for the adjacent tracks can be determined as previously described with respect to the write-stop threshold at step 902. For example, the PES can be monitored to determine whether a distance between the write element and the data track centerline exceeds a threshold distance.

If the position does not exceed the re-write threshold for the adjacent tracks, the data write operation can continue at step 905. Continuation of the data write operation can include writing user data during all or a portion of the data write operation. For example, user data can be written for a pre-determined portion of a revolution of the media or for a pre-determined number of data sectors after determining that the write element is within the re-write threshold. In one embodiment, a single data sector is written if it is determined that the write element is within the write-stop threshold. In various embodiments, continuation of the data write operation can simply include enabling or not disabling the writing of user data in accordance with another data write operation technique.

If the write element position exceeds the re-write threshold for the adjacent tracks, the data write operation can continue at step 906, i.e., it will continue to work on the data write request. Unlike the data write operation as previously described with respect to step 905, however, the actual activity of transferring data to the disk has been stopped at step 903, and such activity will not resume until certain criteria to allow writes again are met.

After determining that the write element was beyond a re-write threshold for the adjacent tracks during a write operation and continuing the write operation, a direction of the position-error of the write element can be determined at step 907. The radial direction of the position-error can be used to identify data tracks potentially infringed by the write operation.

Figure 11:
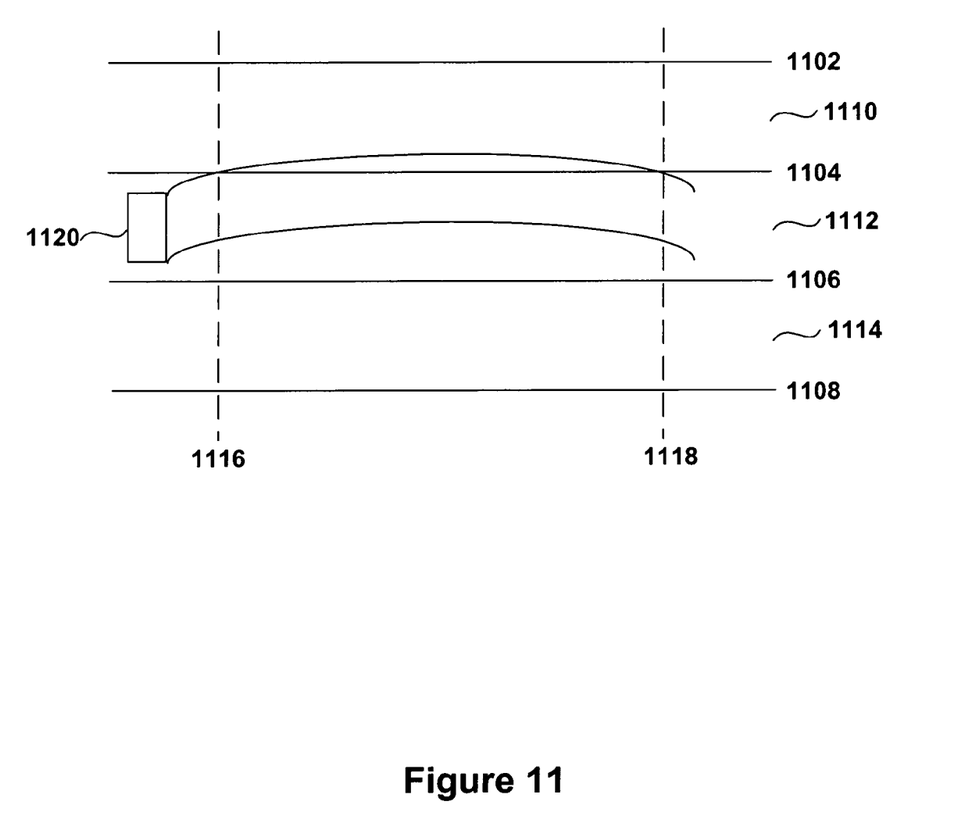
FIG. 11 illustrates three data tracks and a write element executing a write operation that can benefit from embodiments in accordance with the present invention.

After determining the radial direction of the position-error, a part of one or more (adjacent) data tracks in the direction of the position-error can be identified at step 908. A part of a data track in the direction of position-error can circumferentially correspond to that part of the data track being written while the write element was beyond the re-write threshold. For example, FIG. 11 illustrates three data tracks in accordance with an embodiment. Lines 1102, 1104, 1106, and 1108 represent effective boundaries between track 1112 and its two adjacent tracks 1110 and 1114, respectively. A path of write element 1120 while writing data to track 1112 is shown. 1120 may exceed the re-write threshold for the adjacent track 1110 when a portion of its path crosses the boundary into track 1110 between lines 1116 and 1118 while writing data to track 1112, causing data on part of track 1110 to be identified as needs to be re-written.

In one embodiment, the portion of the data track(s) corresponds to data sector(s) radially adjacent to the data sector(s) written while the write element position exceeded the re-write threshold. At step 909, indications of the part of the data track(s) determined at step 907 can be maintained. The indications can be maintained as previously described with respect to FIG. 7, such as by keeping a list of the indications (e.g., the cylinder, head, and sector number corresponding to data sectors) in cache memory. At step 910 it can be determined whether the data write operation is complete. If the data write operation is complete, the flowchart ends at step 911. If the data write operation is not complete, operation of the flowchart can continue to step 901.

Figure 10:
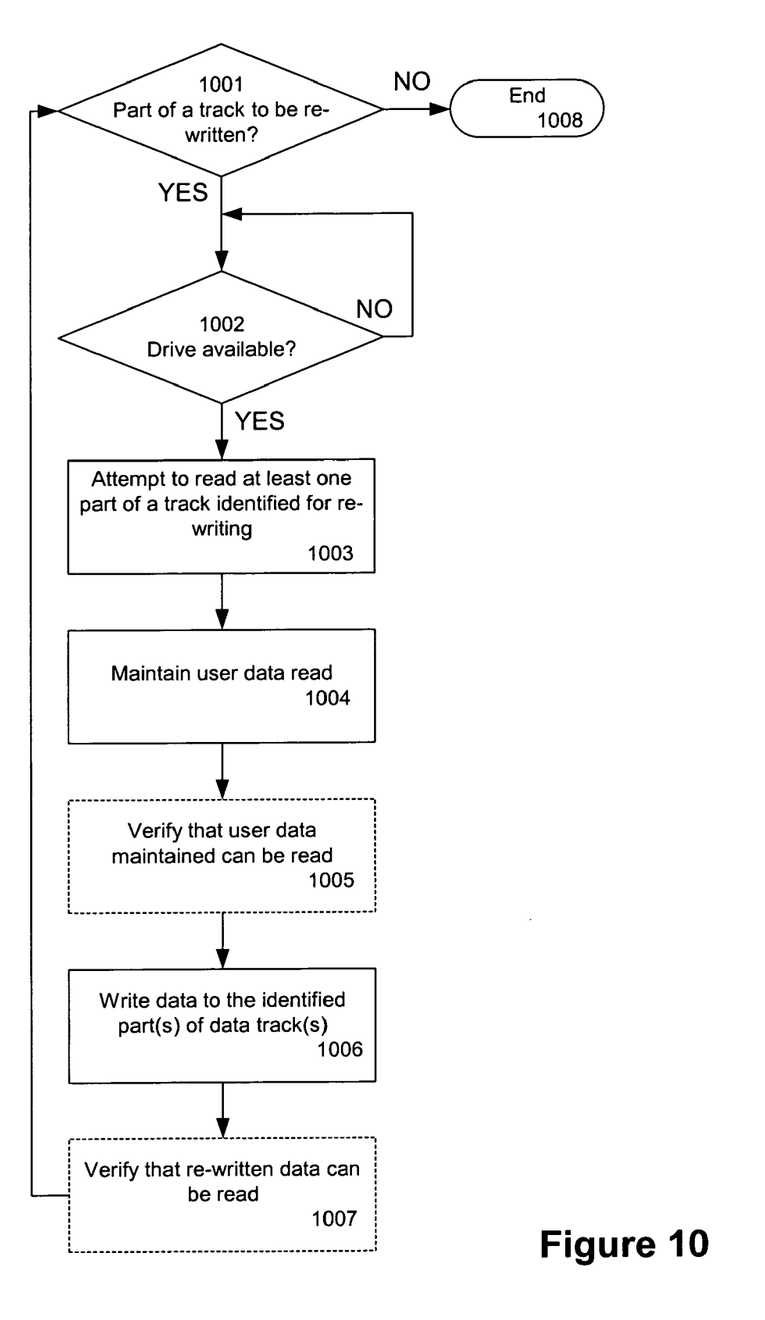
FIG. 10 is a flowchart in accordance with an embodiment for re-writing tracks and portions thereof that are potentially infringed by a data write operation to another track.

FIG. 10 is a flowchart in accordance with an embodiment for re-writing tracks and portions thereof that are potentially infringed by a data write operation to another track. In one embodiment, the flowchart of FIG. 10 can be used to re-write a portion of one more tracks determined according to the flowchart of FIG. 9. At step 1001, it can be determined whether there is a part of a track to be re-written. A list of indications of the parts, including a list of data sectors for example, can be accessed at step 1001. If there are no parts to be re-written, operation of the flowchart can end at step 1008.

At step 1002, it can be determined whether the drive is available. Step 1002 can be performed as previously described with respect to step 802 of FIG. 8. At step 1003, the read element can attempt to read at least one of the parts of a data track identified for re-writing. A list of indications as previously described can be accessed in one embodiment in order to determine any parts to be re-written. For example, a microprocessor or disk controller can access indications in cache memory, flash memory, or on the disk. After determining a part of a track to re-write (such as a number of data sectors), a control mechanism can be used to position a read element over the part of the track to read the corresponding user data.

At step 1004, the user data read at step 1003 can be maintained. In one embodiment, the data is merely retained in cache memory. Many drives cache recently read and written data. In other embodiments, the data can be written and stored in some other memory such as a flash memory or on a portion of the rotatable media.

At optional step 1005, the drive can verify that the data maintained can be read. Although optional, step 1005 can be used to determine if the data potentially infringed was accurately read at step 1003. If the verification fails, the drive can attempt to re-read the data from the part of the data track potentially infringed. In one embodiment, methods for re-positioning the read element for reading can be used. For example, the read element can be "stepped across" the data track in order to read the data. If such an approach fails to read the data on the track, then the drive can erase either one or both of the tracks adjacent to the track that needs to be re-written, and then re-attempt to read the remaining data at various offsets from the center of that track. Such techniques were disclosed in U.S. Pat. No. 4,516,165 entitled "Error Recovery Procedure Using Selective Erasure", by Earl A. Cunningham, et al, filed Dec. 27, 1982. In the case of the current invention, it is likely that the data from the track to be erased is still in the cache memory of the drive since the data may have been written only recently. In this case, that data may not have to be read from the drive prior to erasing it (as disclosed in U.S. Pat. No. 4,516,165).

At step 1006, the user data can be re-written to the appropriate part of the data track. If the data is maintained in a cache or other volatile memory during the re-write operation, the user data can be potentially lost if the drive suffers a power down or other failure during the re-write operation. The data will not be retained after losing power. If the re-write operation has already written over a portion of the data track to be re-written, data may be irretrievably lost. Accordingly, at the cost of speed, the probability of losing data can be decreased by maintaining the data on another portion of the disk or in some other non-volatile memory such as a flash memory.

At optional step 1007, the drive can verify that the re-written data can be read. If the verification fails, a subsequent re-write operation can be attempted for the same data and part of a data track. If the verification is successful, operation of the flowchart can continue to step 1001 to determine if there is another indication of a part of a data track to re-write.

Many features of the present invention can be performed using hardware, software, firmware, or combinations thereof. Consequently, features of the present invention may be implemented using a control mechanism including one or more processors, a disk controller, or servo controller within or associated with a disk drive (e.g., disk drive 100). The control mechanism can include a processor, disk controller, servo controller, or any combination thereof. In addition, various software components can be integrated with or within any of the processor, disk controller, or servo controller.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer or disk drive to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular ICs), or any type of media or device suitable for storing instructions and/or data.

Stored on any one of the computer readable medium (media), the present invention includes software for controlling both the hardware of the general purpose/specialized computer, microprocessor, disk drive, and/or for enabling the computer or microprocessor to interact with a human user of other mechanism utilizing the results of the present invention. Such software may include, but is not limited to, device drivers, operating systems, execution environments/containers, and user applications.

In one embodiment, a system is implemented exclusively or primarily in hardware using, for example, hardware components such as application specific integrated circuits (ASICs). Implementation of the hardware state machine so as to perform the functions described herein will be apparent to persons skilled in the relevant art(s).

Although embodiments described herein refer generally to systems having a magnetic disk, any media, or at least any rotating media, upon which information is written, placed, or stored, may be able to take advantage of embodiments of the invention, as re-writing in accordance with embodiments in optical, electrical, magnetic, mechanical, and other physical systems can be performed.

Although various embodiments of the present invention, including exemplary and explanatory methods and operations, have been described in terms of multiple discrete steps performed in turn, the order of the descriptions should not necessarily be construed as to imply that the embodiments are order dependent. Where practicable for example, various operations can be performed in alternative orders than those presented herein.

The foregoing description of embodiments of the present invention has been provided for the purposes of illustration and description. It is not intended to be exhaustive or to limit the invention to the precise forms disclosed. Many modifications and variations will be apparent to the practitioner skilled in the art. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A method of writing data in a device including a rotatable storage medium comprising:
   determining a position of a write element during a write operation to a target track of the rotatable storage medium;
   determining whether the position of the write element is within a threshold;
   identifying a part of a second track corresponding to the position of the write element while not within the threshold by:
      determining a position-error of the write element while the position of the write element is not within the threshold;
      determining a direction of the position-error; and
      identifying a part of the second track, the second track being a track in the direction of the position-error; and
   re-writing data of the part of the second track when the device is available.

2. The method of claim 1, wherein the part of the second track is radially aligned with the position of the write element while not within the threshold.

3. The method of claim 1, wherein the part of the second track is a data sector of the second track, wherein a portion of the data sector of the second track is radially aligned with a portion of a data sector of the target track written while the position of the write element was not within the threshold.

4. A method of writing data in a device including a rotatable storage medium comprising:

determining a position of a write element during a write operation to a target track of the rotatable storage medium;

determining whether the position of the write element is within a threshold;

identifying a part of a second track corresponding to the position of the write element while not within the threshold, wherein identifying the part of the second track comprises at least one of:

identifying a part of the second track, the second track radially adjacent to the target track;

identifying a part of the second track, the part of the second track circumferentially corresponding to a part of the target track written while the position of the write element was not within the threshold;

identifying at least one data sector of the second track, a portion of the at least one data sector radially aligned with the write element while not positioned within the threshold; and identifying at least one data sector of the second track that may have been infringed by the write element while the position of the write element was not within the threshold; and re-writing data of the part of the second track when the device is available.

* * * * *